(No Model.)

D. MAY.
Vehicle-Wheel Hub.

No. 227,806. Patented May 18, 1880.

Witnesses
Fred G. Dieterich
Albert H. Krause

Inventor
Daniel May
by Louis Bagger
Attorneys

UNITED STATES PATENT OFFICE.

DANIEL MAY, OF LUMBERTON, NORTH CAROLINA.

VEHICLE-WHEEL HUB.

SPECIFICATION forming part of Letters Patent No. 227,806, dated May 18, 1880.

Application filed March 20, 1880. (No model.)

*To all whom it may concern:*

Be it known that I, DANIEL MAY, of Lumberton, in the county of Robeson and State of North Carolina, have invented certain new and useful Improvements in Hubs for Vehicles; and I do hereby declare that the following is a full, clear, and exact description thereof, which will enable others skilled in the art to which it appertains to make and use the same, reference being had to the accompanying drawings, which form a part of this specification, and in which—

Figure 1:
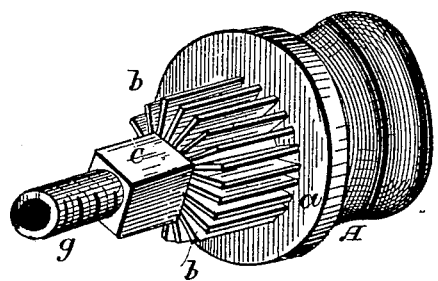
Figure 3:
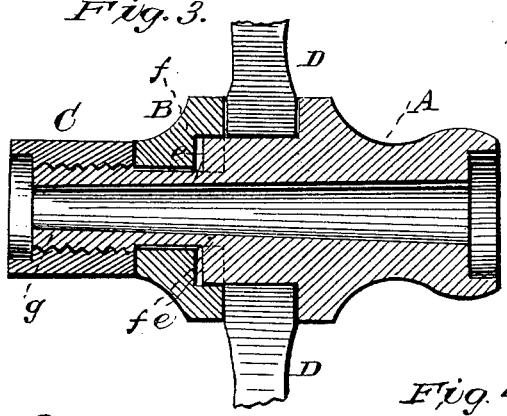
Figure 2:
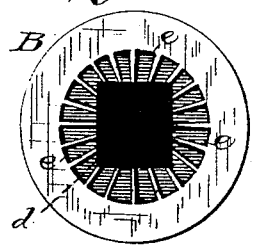
Figure 4:
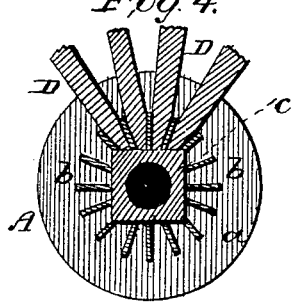

Figure 1 is a perspective view of the axle-box with its rigid hub and flanges. Fig. 2 is a similar view of the detachable clamping-plate. Fig. 3 is an axial section of the hub with spokes inserted, and Fig. 4 is a cross-section of the same.

Similar letters of reference indicate corresponding parts in all the figures.

The object of my invention is to produce a hub for vehicles which shall consist of few parts simply put together, so as to combine cheapness of manufacture with strength and durability, and which admits of the detaching of the spokes and of their reinsertion in a simple and easy manner, substantially as hereinafter more fully set forth.

In the drawings, A is the axle-box, which is cast in one piece with the rigid circular hub-flange $a$, and provided with a series of circumferential ribs or flanges, $b$ $b$, extending from flange $a$ outward to the square section $c$ of the axle-box.

B is an annular plate, having a central square aperture, $d$, which fits upon the square section $c$, above referred to.

Plate B has on its inner side or face, surrounding its central aperture, $d$, a series of circumferential recesses or depressions, (denoted by $e$ $e$ $e$,) which register with and receive the outward ends of the flanges $b$.

The spokes D are tenoned off at their lower ends to fit into the spaces between the webs or flanges $b$ $b$, and are held firmly in place by being clamped sidewise between the annular flange $a$ and the smooth rim or face of plate B, as will appear more clearly by reference to Fig. 3 on the sheet of drawings.

The circumferential recesses $e$ in plate B are made of such a depth as to leave a narrow space (denoted by $f$) after the plate has been by the nut C screwed home upon the spokes, which admits of these being tightened in their seat, as occasion requires, by tightening the nut C, which works upon the screw-threaded cylindrical tap $g$ of the axle-box. By loosening this nut and plate B any one or all of the spokes may readily be withdrawn from the hub.

Having thus described my invention, I claim and desire to secure by Letters Patent of the United States—

The combination, with the box or hub A, having the flange $a$, and a reduced portion provided with a series of radial spaced-apart partitions, $b$, said reduced portion having an angular extension, $c$, beyond the partitions $b$, and the extension $c$ provided with a screw-threaded portion, $g$, of the plate B, with its inner face provided with a concentric series of recesses, $e$ $e$, coincident with and receiving the free ends of the spoke-partitions $b$ $b$, and with that portion of its same face beyond the recesses $e$ fitting against and clamping the spokes, as shown and described.

In testimony that I claim the foregoing as my own I have hereto affixed my signature in presence of two witnesses.

DANIEL MAY.

Witnesses:
ALFD. ROWLAND,
L. M. GILLESPIE.